(12) United States Patent
Tong

(10) Patent No.: US 11,040,830 B1
(45) Date of Patent: Jun. 22, 2021

(54) BUCKLE TYPE ROLLER CONVEYING SLIDEWAY

(71) Applicant: Guangdong Oufulong Automatic Shelf Technology Co., Ltd., Guangdong (CN)

(72) Inventor: Fei Tong, Guangdong (CN)

( * ) Notice: Subject to any disclaimer, the term of this patent is extended or adjusted under 35 U.S.C. 154(b) by 0 days.

(21) Appl. No.: 16/988,699

(22) Filed: Aug. 9, 2020

(30) Foreign Application Priority Data

Apr. 10, 2020 (CN) .......................... 202020521624.9

(51) Int. Cl.
*B65G 13/11* (2006.01)
*B65G 39/12* (2006.01)

(52) U.S. Cl.
CPC .................... *B65G 13/11* (2013.01)

(58) Field of Classification Search
CPC ............................... B65G 13/11; B65G 39/12
USPC ....................................................... 193/35 R
See application file for complete search history.

(56) References Cited

U.S. PATENT DOCUMENTS

| | | | | |
|---|---|---|---|---|
| 2,593,089 | A * | 4/1952 | Dodge ................... | B65G 39/12 193/35 R |
| 6,089,385 | A * | 7/2000 | Nozawa ................... | A47F 7/28 193/35 R |
| 8,276,772 | B2 * | 10/2012 | Kim ........................ | A47F 1/12 211/151 |
| 8,376,154 | B2 * | 2/2013 | Sun ........................ | A47F 1/125 211/151 |
| 9,220,353 | B2 * | 12/2015 | Brugmann ............. | B65G 1/023 |
| 9,266,678 | B2 * | 2/2016 | Nickell .................. | B65G 13/11 |
| 9,994,395 | B2 * | 6/2018 | Tong ...................... | B65G 13/11 |
| 10,076,054 | B2 * | 9/2018 | Goergen ............. | H05K 7/1491 |
| 10,159,359 | B2 * | 12/2018 | Borg ..................... | A47F 5/0043 |
| 10,858,197 | B2 * | 12/2020 | Karol .................... | B65G 39/12 |

FOREIGN PATENT DOCUMENTS

CN 210102637 U 2/2020

\* cited by examiner

Primary Examiner — Douglas A Hess
(74) Attorney, Agent, or Firm — ZANIP

(57) ABSTRACT

A buckle type roller conveying slideway comprises a base, two ends and two side covers, the two ends are arranged at the front end and the rear end of the base respectively, and at least one end is assembled together with the end part of the base through a buckle connecting structure. During assembly, the ends and the base are firmly assembled and fixed together through the buckle connecting structures between the ends and the base, the whole assembling process is simple, easy and fast, and fasteners such as screws do not need to be additionally used or stamping and other procedures do not need to be additionally added for fixing, so that the assembling efficiency is improved, and the assembling labor intensity is also reduced.

9 Claims, 3 Drawing Sheets

BUCKLE TYPE ROLLER CONVEYING SLIDEWAY

TECHNICAL FIELD

The disclosure pertains to the technical field of roller conveying equipment, in particular to a buckle type roller conveying slideway.

BACKGROUND

At present, a roller conveying slideway on the market nowadays comprises a base, two ends and two side covers; in some of these roller conveying slideways, the two ends are integrated with the base, the two side covers are installed on the left side and the right side of the base to fix a plurality of rollers arranged on the base, but the length of the slideway of the structure is fixed and cannot be changed in the production process, so that inflexibility of production and use is caused. In some of these roller conveying slideways, the ends and the base are not integrally arranged, during production, the ends and the base are connected through screws and side covers, or concave positions are formed in the surfaces of the ends, deformation parts are formed by stamping the surfaces of the side covers to be clamped in the concave positions, and connection of the ends and the base is achieved, wherein the production and machining procedures of the roller conveying slideway are tedious, low in efficiency and high in cost by adopting a screw and side cover mode, the production and machining precision requirement of the roller conveying slideway fixed by adopting a stamping mode is high, the deformation parts formed by stamping and the concave positions need to be aligned accurately and need to be matched, and if the stamping machining precision is low, the defects of end damage or looseness caused by inaccurate alignment and low stamping precision are easily caused, and the product quality is difficult to guarantee.

SUMMARY

In order to solve the problem existing in the prior art, the disclosure provides the buckle type roller conveying slideway which is simple, easy and rapid in assembly, high in assembly efficiency and low in assembly labor intensity, and ends and a base which are separated are firmly assembled and fixed together through buckle connecting structures between the ends and the base.

In order to solve the technical problem, a technical solution adopted by the disclosure is as follows:

A buckle type roller conveying slideway comprises a base, two ends and two side covers, wherein a plurality of opening slots for installing rollers are formed in the upper surface of the base, two ends of each roller are clamped in two opening slots respectively, the two side covers are installed on the left side and the right side of the base respectively, the opening slots in the upper surface of the base are covered with side plates at the upper ends of the side covers, and the rollers are rotationally limited to the upper surface of the base; the two ends are arranged at the front end and the rear end of the base respectively, and at least one end is assembled together with the end part of the base through a buckle connecting structure.

Furthermore, the inner end of at least one end is provided with more than one inverted buckle type chuck, and the end part of at least one end of the base is provided with a clamping cavity; and during assembly, the inverted buckle type chucks are inserted into the clamping cavities in a matched mode and hook the cavity walls of the clamping cavities.

Furthermore, the inner ends of the ends are provided with two inverted buckle type chucks, the two inverted buckle type chucks are arranged in a left-right symmetrical mode, the end part of the base is provided with two clamping cavities, and the two clamping cavities are arranged in a left-right symmetrical mode; and during assembly, the two inverted buckle type chucks are inserted into the two clamping cavities in a one-to-one correspondence mode and hook the cavity walls of the clamping cavities.

Furthermore, the inverted buckle type chucks and the ends are of an integral structure, and the clamping cavities and the base are of an integral structure.

Furthermore, the inner end of at least one end is provided with more than one clamping cavity, and the end part of at least one end of the base is provided with an inverted buckle type chuck; and during assembly, the inverted buckle type chucks are inserted into the clamping cavities in a matched mode and hook the cavity walls of the clamping cavities.

Furthermore, the inner ends of the ends are provided with two clamping cavities, the two clamping cavities are arranged in a left-right symmetrical mode, the end part of the base is provided with two inverted buckle type chucks, and the two inverted buckle type chucks are arranged in a left-right symmetrical mode; and during assembly, the two inverted buckle type chucks are inserted into the two clamping cavities in a one-to-one correspondence mode and hook the cavity walls of the clamping cavities.

Furthermore, the clamping cavities and the ends are of an integral structure, and the inverted buckle type chucks and the base are of an integral structure.

Furthermore, the base is composed of more than two sections of single base bodies, wherein the end, facing the outside, of at least one section of single base body in the single base bodies at the head section and the tail section is assembled together with the ends through buckle connecting structures, and the outer surface of the adjacent end of the two sections of single base bodies and the inward deformation parts of the side covers are mutually clamped and fixed or fixed together through fasteners.

Furthermore, the inner end of at least one end is provided with more than one inverted buckle type chuck, and the end, facing the outside, of at least one section of single base body in the single base bodies at the head section and the tail section is provided with a clamping cavity; or, the inner end of at least one end is provided with more than one clamping cavity, and the end, facing the outside, of at least one section of single base body in the signal base units at the head section and the tail section is provided with an inverted buckle type chuck; and during assembly, the inverted buckle type chucks are inserted into the clamping cavities in a matched mode and hook the cavity walls of the clamping cavities.

Furthermore, each inverted buckle type chuck consists of two inverted buckles, the two inverted buckles are separately arranged in a left-right symmetrical mode, and hooks at the tail ends of the inverted buckles are outward.

Furthermore, the left sides and the right sides of the ends assembled together with the end part of the base through buckle connecting structures are provided with guide fixture blocks, and the guide fixture blocks on the left sides and the right sides are respectively clamped in straight slots formed in the two side covers when the ends are assembled together with the base through the buckle connecting structures.

Furthermore, the two ends are both assembled together with the end part of the base through the buckle connecting structures.

The disclosure has the following beneficial effects:

through the technical scheme, the ends and the base which are separated are firmly assembled and fixed together through the buckle connecting structures between the ends and the base, the whole assembling process is simple, easy and fast, and fasteners such as screws do not need to be additionally used or stamping and other procedures do not need to be additionally added for fixing, so that the assembling efficiency is improved, and the assembling labor intensity is also reduced.

DESCRIPTION OF THE EMBODIMENTS

In order to make the objectives, technical solutions and advantages of the disclosure clearer, the disclosure will be further described hereinbelow with reference to the attached drawings and embodiments thereof. It shall be understood that, the embodiments described herein are only intended to illustrate but not to limit the disclosure.

Embodiment I

Figure 1:
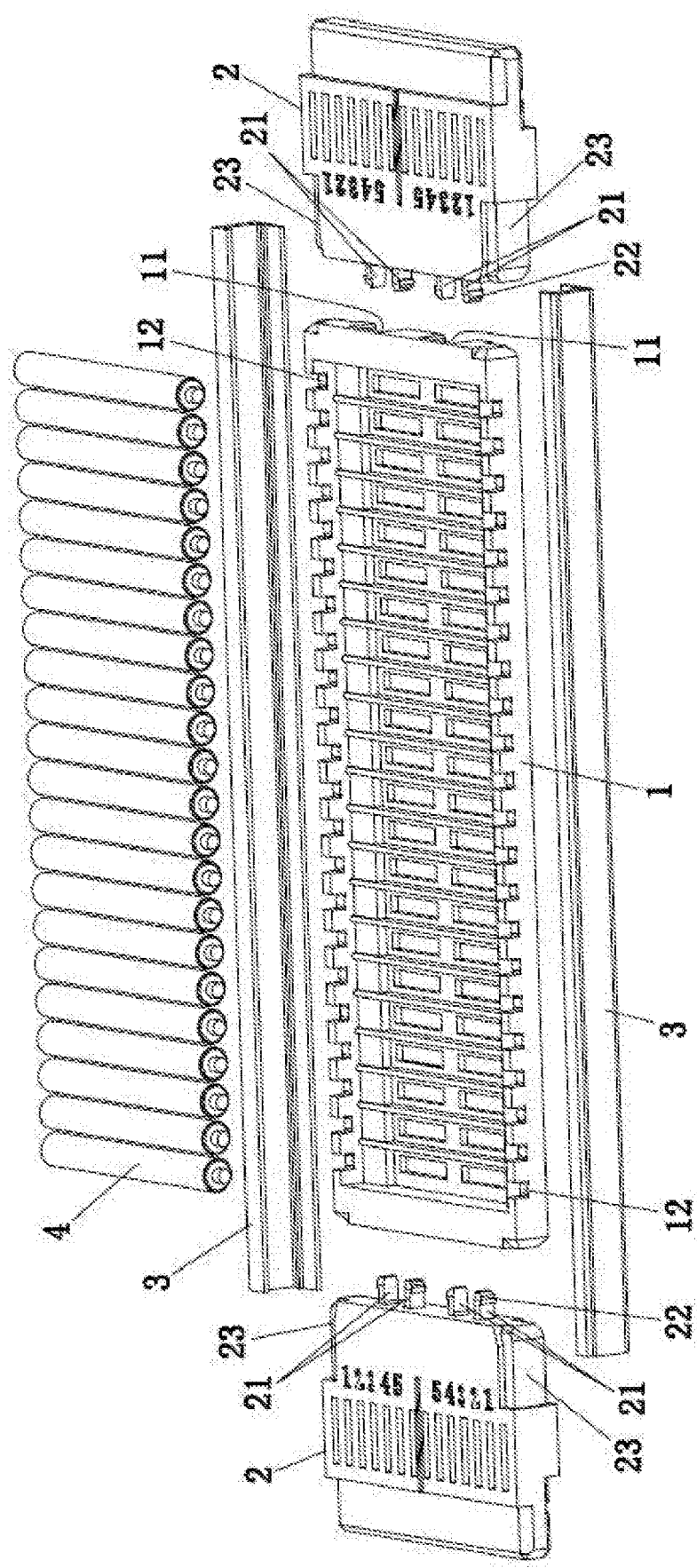
FIG. 1 is an explosion structure diagram in the embodiment I of a buckle type roller conveying slideway of the disclosure.
Figure 2:
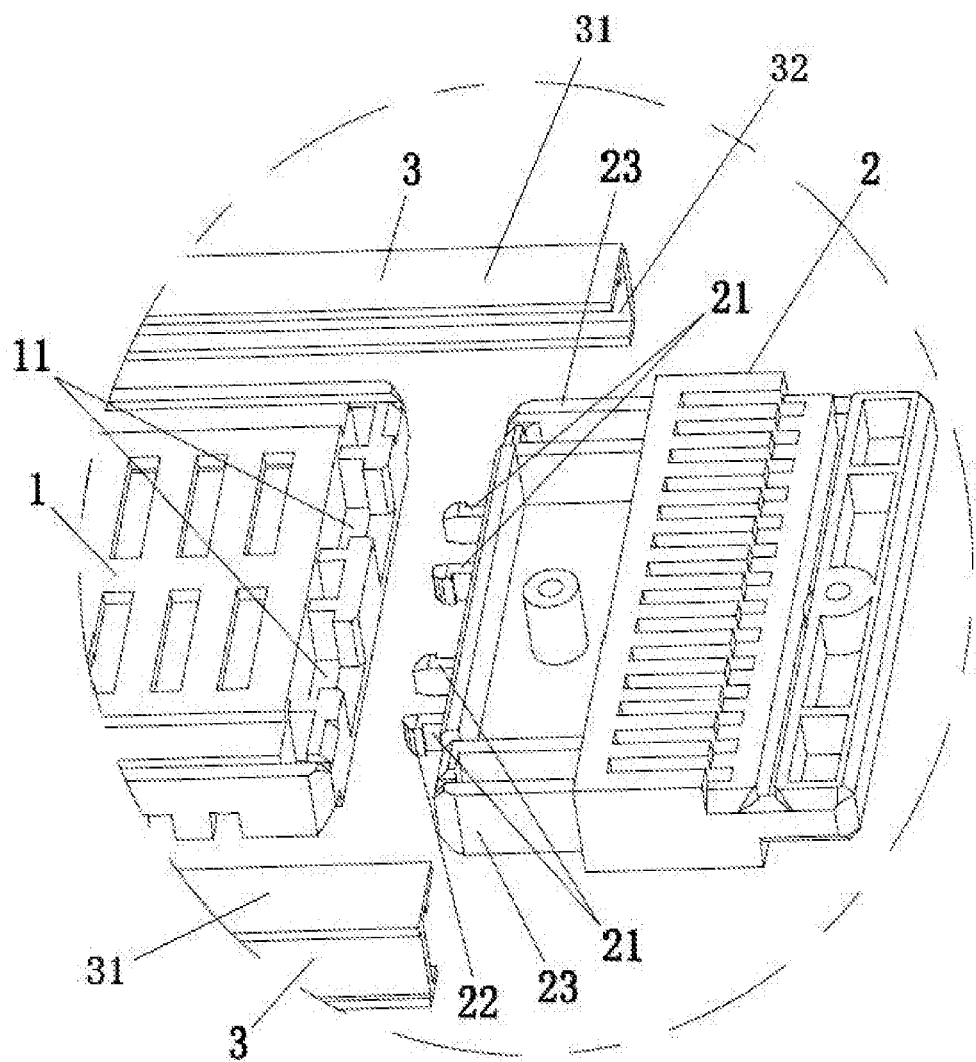
FIG. 2 is a local structure diagram in the embodiment II of the buckle type roller conveying slideway of the disclosure.

As shown in FIG. 1 and FIG. 2, a buckle type roller conveying slideway in the embodiment I of the disclosure comprises a base 1, two ends 2 and two side covers 3. Wherein, a plurality of rollers 4 distributed in an array are installed on the upper surface of the base 1, the two side covers 3 are installed on the left side and the right side of the base 1 respectively, and the rollers 4 are rotationally limited to the upper surface of the base 1; the two ends 2 are arranged at the front end and the rear end of the base 1 respectively, and the two ends 2 are both assembled together with the end part of the base 1 through buckle connecting structures, the concrete structure can be as follows: the inner ends of the ends 2 are provided with more than one inverted buckle chuck, the end parts of two ends of the base 1 are provided with clamping cavities, and during assembly, the inverted buckle type chucks are inserted into the clamping cavities 11 in a matched mode and hook the cavity walls of the clamping cavities. As shown in FIG. 2, the inner ends of the ends 2 are provided with two inverted buckle type chucks, the two inverted buckle type chucks are arranged in a left-right symmetrical mode, each inverted buckle type chuck may consist of two inverted buckles 21, the two inverted buckles 21 are separately arranged in a left-right symmetrical mode, and hooks 22 at the tail ends of the inverted buckles are outward; the end part of the base 1 is provided with two clamping cavities 11, the two clamping cavities 11 are arranged in a left-right symmetrical mode; and moreover, the two inverted buckle type chucks and the ends 2 are of an integral structure, and the clamping cavities 11 and the base 1 are of an integral structure (for example, the inverted buckle type chucks and the ends 2 are integrated through injection molding, and the clamping cavities 11 and the base 1 are integrated through injection molding).

When the buckle type roller conveying slideway in the embodiment I of the disclosure is assembled, a plurality of opening slots 12 for installing rollers 4 are formed in the upper surface of the base 1, two ends of each roller 4 are clamped in two opening slots 12 respectively, when the two side covers 3 are installed on the left side and the right side of the base 1 respectively, simultaneously, the opening slots 12 in the upper surface of the base 1 are covered with side plates 31 at the upper ends of the side covers 3, and the end parts of the rollers 4 are prevented from being separated from the opening slots 12 by the side plates 31 at the upper ends, so that the rollers 4 are rotationally limited to the upper surface of the base 1, and finally, the two inverted buckle type chucks are inserted into the two clamping cavities 11 in a one-to-one correspondence mode and hook the cavity walls of the clamping cavities.

Thus, the ends 2 and the base 1 which are separated in the roller conveying slideway of the disclosure are firmly assembled and fixed together through the buckle connecting structures (namely the inverted buckle chucks and the clamping cavities 11) between the ends 1 and the base 1, the whole assembling process is simple, easy and fast, and fasteners such as screws do not need to be additionally used or stamping and other procedures do not need to be additionally added for fixing, so that the assembling efficiency is improved, and the assembling labor intensity is reduced.

As shown in FIG. 1 and FIG. 2, in the buckle type roller conveying slideway in the embodiment of the disclosure, the left sides and the right sides of the ends 2 assembled together with the end part of the base 1 through the buckle connecting structures are provided with guide fixture blocks 23, and the guide fixture blocks 23 on the left sides and the right sides are respectively clamped in straight slots 32 formed in the two side covers 3 when the ends 2 are assembled together with the base 1 through the buckle connecting structures. Thus, when the ends 2 are assembled together with the end part of the base 1 through the buckle connecting structures, a guiding effect is achieved, the inverted buckle type chucks are aligned to the clamping cavities 11 and smoothly inserted into the clamping cavities 11, assembling is more convenient and easier, and the guide fixture blocks 23 are clamped in the side covers 3, so that the overall structure connecting stability among the ends 2, the base 1, the two side covers 3 and the rollers 4 is further enhanced, and the roller conveying slideway is better in performance.

Certainly, in the buckle type roller conveying slideway in the embodiment I of the disclosure, the inner end of at least one end 2 also can be provided with more than one clamping cavity 11, and the end part of at least one end of the base 1 is provided with an inverted buckle type chuck; and during assembly, the inverted buckle type chucks are inserted into the clamping cavities 11 in a matched mode and hook the cavity walls of the clamping cavities 11, and the concrete structure is as follows: the inner ends of the ends 2 are provided with two clamping cavities 11, the two clamping cavities 11 are arranged in a left-right symmetrical mode, the end part of the base 1 is provided with two inverted buckle type chucks, the two inverted buckle type chucks are arranged in a left-right symmetrical mode, the clamping cavities 11 and the ends 2 are of an integral structure, and the inverted buckle type chucks and the base 1 are of an integral structure; and during assembly, the two inverted buckle type chucks are inserted into the two clamping cavities 11 in a one-to-one correspondence mode and hook the cavity walls of the clamping cavities 11.

In addition, only one end 2 of the buckle type roller conveying slideway in the embodiment I of the disclosure also can be assembled together with the end part of the base 1 through a buckle connecting structure.

Embodiment II

Figure 3:
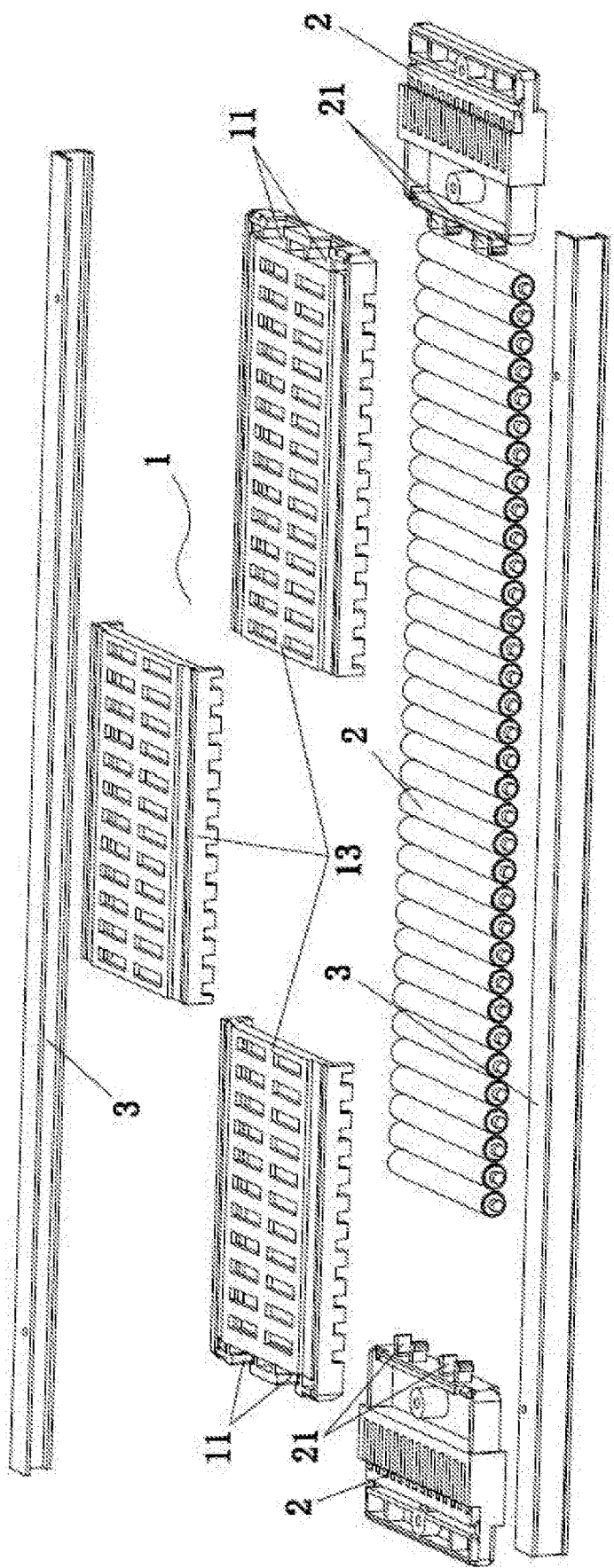
FIG. 3 is an explosion structure diagram in the embodiment II of the buckle type roller conveying slideway of the disclosure.

As shown in FIG. 3, the buckle type roller conveying slideway in the embodiment II of the disclosure comprises a base 1, two ends 2 and two side covers 3; wherein a plurality of rollers 4 distributed in an array are installed on the upper surface of the base 1, the two side covers 3 are installed on the left side and the right side of the base 1 respectively, and the rollers 4 are rotationally limited to the upper surface of the base 1; the two ends 2 are arranged at the front end and the rear end of the base 1 respectively, and the two ends 2 are both assembled together with the end part of the base 1 through buckle connecting structures. The difference only lies in that the base 1 is composed of three sections of single base bodies 13 (also can be composed of more than two sections or three sections of single base bodies 13), and the ends, facing the outside, in the single base bodies 13 at the head section and tail section are assembled together with the ends 2 through the buckle connecting structures, and the specific structure can be as follows: the inner ends of the ends 2 are provided with more than one inverted buckle chuck, and the ends, facing the outside, in the single base bodies 13 at the head section and the tail section are provided with clamping cavities 11 (or the inner ends of the two ends 2 are also provided with more than one clamping cavity 11, and the end, facing the outside, of at least one section of single base body 13 in the single base bodies 13 at the head section and the tail section is provided with an inverted buckle type chuck); and during assembly, the inverted buckle type chucks are inserted into the clamping cavities 11 in a matched mode and hook the cavity walls of the clamping cavities 11, and the outer surfaces of the adjacent ends of the two sections of single base bodies 13 and the inward deformation parts of the side covers 3 are mutually clamped and fixed, for example, the inward deformation parts formed by the side covers 3 in a stamping mode and the outer surfaces of the single base bodies 13 are firmly buckled and connected together, and certainly, the adjacent ends of the two sections of single base bodies 13 also can be fixed together with the side covers 3 by adopting fasteners such as screws. Thus, the bases 1 with different lengths can be spliced according to the order requirements of customers so as to machine roller conveying slideways with different length specifications, so that the assembly flexibility is greatly enhanced, the mold manufacturing of the bases 1 with different specifications is also reduced, and the mold machining cost can be obviously reduced.

Certainly, in the buckle type roller conveying slideway in the embodiment II of the disclosure, the end, facing the outside, of at least one section of single base body in the single base bodies 13 at the head section and the tail section also can be assembled together with the ends 2 through the buckle connecting structures, and specifically, the inner end of at least one end 2 is provided with more than inverted buckle type chuck, and the end, facing the outside, of at least one section of single base body 13 in the single base bodies 13 at the head section and the tail section is provided with a clamping cavity 11; or, the inner end of at least one end 2 is provided with more than one clamping cavity 11, and the end, facing the outside, of at least one section of single base body 13 in the single base bodies 13 at the head section and the tail section is provided with an inverted buckle type chuck; and during assembly, the inverted buckle type chucks are inserted into the clamping cavities 11 in a matched mode and hook the cavity walls of the clamping cavities 11.

The foregoing descriptions are only preferred implementation manners of the disclosure. It should be noted that for those of ordinary skill in the art, several improvements and modifications may further be made without departing from the principle of the disclosure. These improvements and modifications should also be deemed as falling within the protection scope of the disclosure.

What is claimed is:

1. A buckle type roller conveying slideway, wherein comprising a base (1), two ends (2) and two side covers (3), wherein a plurality of opening slots (12) for installing rollers (4) are formed in the upper surface of the base (1), two ends of each roller (4) are clamped in two opening slots (12) respectively, the two side covers (3) are installed on the left side and the right side of the base (1) respectively, the opening slots (12) in the upper surface of the base (1) are covered with side plates (31) at the upper ends of the side covers (3), and the rollers (4) are rotationally limited to the upper surface of the base (1); the two ends (2) are arranged at the front end and the rear end of the base (1) respectively, and at least one end (2) is assembled together with at least one end part of the base (1) through a buckle connecting structure;

wherein inner ends of the ends (2) are provided with two inverted buckle type chucks, the two inverted buckle type chucks are arranged in a left-right symmetrical mode, the end part of the base (1) is provided with two clamping cavities (11), and the two clamping cavities (11) are arranged in a left-right symmetrical mode; and during assembly, the two inverted buckle type chucks are inserted into the two clamping cavities (11) in a one-to-one correspondence mode and hook cavity walls of the clamping cavities (11).

2. The buckle type roller conveying slideway according to claim 1, wherein the inverted buckle type chucks and the ends (2) are of an integral structure, and the clamping cavities (11) and the base (1) are of an integral structure.

3. The buckle type roller conveying slideway according to claim 1, wherein the base (1) is composed of more than two sections of single base bodies (13), wherein the end, facing the outside, of at least one section of single base body (13) in the single base bodies (13) at a head section and a tail section is assembled together with the ends (2) through buckle connecting structures, and the outer surface of the adjacent end of the two sections of single base bodies (13) and the inward deformation parts of the side covers (3) are mutually clamped and fixed or fixed together through fasteners.

4. The buckle type roller conveying slideway according to claim 3, wherein the inner end of at least one end (2) is provided with more than one inverted buckle type chuck, and the end, facing the outside, of at least one section of single base body (13) in the single base bodies (13) at the head section and the tail section is provided with a clamping cavity (11); or, the inner end of at least one end (2) is provided with more than one clamping cavity (11), and the end, facing the outside, of at least one section of single base body (13) in the signal base units (13) at the head section and the tail section is provided with an inverted buckle type chuck; the inverted buckle type chucks are in one-to-one correspondence with the clamping cavities (11), and during assembly, the inverted buckle type chucks are inserted into the clamping cavities (11) in a matched mode and hook the cavity walls of the clamping cavities (11).

5. The buckle type roller conveying slideway according to claim 1, wherein each inverted buckle type chuck consists of two inverted buckles (21), the two inverted buckles (21) are separately arranged in a left-right symmetrical mode, and hooks (22) at the tail ends of the inverted buckles are outward.

6. The buckle type roller conveying slideway according to claim 1, wherein the left sides and the right sides of the ends (2) assembled together with the end part of the base (1) through buckle connecting structures are provided with guide fixture blocks (23), and the guide fixture blocks (23) on the left sides and the right sides are respectively clamped in straight slots (32) formed in the two side covers (3) when the ends (2) are assembled together with the base (1) through the buckle connecting structures.

7. The buckle type roller conveying slideway according to claim 1, wherein the two ends (2) are both assembled together with the end of the base (1) through the buckle connecting structures.

8. A buckle type roller conveying slideway, wherein comprising a base (1), two ends (2) and two side covers (3), wherein a plurality of opening slots (12) for installing rollers (4) are formed in the upper surface of the base (1), two ends of each roller (4) are clamped in two opening slots (12) respectively, the two side covers (3) are installed on the left side and the right side of the base (1) respectively, the opening slots (12) in the upper surface of the base (1) are covered with side plates (31) at the upper ends of the side covers (3), and the rollers (4) are rotationally limited to the upper surface of the base (1); the two ends (2) are arranged at the front end and the rear end of the base (1) respectively, and at least one end (2) is assembled together with at least one end part of the base (1) through a buckle connecting structure:

wherein inner ends of the ends (2) are provided with two clamping cavities (11), the two clamping cavities (11) are arranged in a left-right symmetrical mode, the end part of the base (1) is provided with two inverted buckle type chucks, and the two inverted buckle type chucks are arranged in a left-right symmetrical mode; and during assembly, the two inverted buckle type chucks are inserted into the two clamping cavities (11) in a one-to-one correspondence mode and hook cavity walls of the clamping cavities (11).

9. The buckle type roller conveying slideway according to claim 8, wherein the clamping cavities (11) and the ends (2) are of an integral structure, and the inverted buckle type chucks and the base (1) are of an integral structure.

* * * * *